Patented Mar. 13, 1951

2,544,660

UNITED STATES PATENT OFFICE 2,544,660

BENZHYDRYLUREA ADDITION COMPOUND AND METHOD FOR PREPARING SAME

Robert Duschinsky, Essex Fells, N. J., assignor to Hoffmann-La Roche Inc., Nutley, N. J., a corporation of New Jersey No Drawing. Application November 17, 1949, Serial No. 128,004

2 Claims. (Cl. 260—553)

The present invention relates to a new addition compound of benzhydrylurea and to its method of production.

According to my invention, I have found that benzhydrylurea combines with α-amino-α,α-diphenylacetamide to form a new benzhydrylurea addition compound, which is designated herein as α-amino-α,α-diphenylacetamide·benzhydrylurea. The compound is useful for pharmaceutical purposes, more particularly as an anticonvulsant.

The α-amino-α,α-diphenylacetamide·benzhydrylurea can readily be prepared by reacting together α-amino-α,α-diphenylacetamide and benzhydrylurea in equimolecular proportions. The reaction can be carried out in the presence of a solvent for the component substances, or by fusing the two compounds together. Any suitable solvent, for example, xylene, toluene, benzene, ethanol, and the like may be employed in the preparation of the α-amino-α,α-diphenylacetamide·benzhydrylurea. Warming facilities solution of the reagents in the solvent. Upon cooling, the new compound precipitates from the reaction medium.

The benzhydrylurea employed as a component can readily be prepared by saponifying 1-benzhydryl-3-acetylurea with an alkaline saponifying agent, for example, sodium hydroxide or potassium hydroxide. 1-benzhydryl-3-acetylurea is claimed in my copending application Ser. No. 104,394, filed July 12, 1949, and can be prepared as described therein by reacting benzhydrol with acetylurea in the presence of sulfuric acid and acetic anhydride. More specifically the benzhydrylurea can be prepared as follows. To a mixture of 7.4 grams of benzhydrol, 4 grams of acetylurea, 50 cc. of acetic acid and 5 cc. of acetic anhydride was added a mixture of 5 cc. of acetic acid and 0.5 cc. of 97 per cent sulfuric acid. Heat was evolved spontaneously and the reaction was completed by refluxing for ten minutes. The reaction mixture was poured into 1,000 cc. of water, whereupon 1-benzhydryl-3-acetylurea crystallized. It was filtered and washed with dry ice-cooled ethanol. Upon recrystallization of the compound from 35 cc. of ethanol, it melted at 153–155° C. A mixture of 13.4 grams of 1-acetyl-3-benzhydrylurea, 35 cc. of alcohol, and 10.8 cc. of 5 N sodium hydroxide was refluxed for 10 minutes, and 200 cc. of water were added to the resulting solution. Upon cooling, benzhydrylurea crystallized. It was filtered and washed with water. It melted as 147–148° C.

The following examples will serve to illustrate the invention.

*Example 1*

10 grams of α-amino-α,α-diphenylacetamide and 10 grams of benzhydrylurea were dissolved in 150 cc. of hot (about 140° C.) xylene. Upon cooling the solution, prismatic needles were deposited. The crystals were washed with xylene and ether. The melting point of the α-amino-α,α-diphenylacetamide·benzhydrylurea thus obtained was 136–137° C. The melting point of the new compound was depressed when it was admixed with either one of its components. Recrystallization of the α-amino-α,α-diphenylacetamide·benzhydrylurea from solvents such as xylene and aqueous alcohol produced no separation of the components nor did treatment at room temperature with 1 N sodium hydroxide.

*Example 2*

200 milligrams of α-amino-α,α-diphenylacetamide and 200 milligrams of benzhydrylurea were mixed and fused together at 150° C. On cooling the melt, crystalline α-amino-α,α-diphenylacetamide·benzhydrylurea was obtained.

I claim:

1. The addition compound α-amino-α,α-diphenylacetamide·benzhydrylurea.

2. The method of preparing the addition compound α-amino-α,α-diphenylacetamide·benzhydrylurea which comprises reacting α-amino-α,α-diphenylacetamide with benzhydrylurea in equimolecular proportions.

ROBERT DUSCHINSKY.

No references cited.